United States Patent
Hagio et al.

(10) Patent No.: US 10,550,005 B2
(45) Date of Patent: Feb. 4, 2020

(54) PRODUCTION METHOD FOR ZEOLITE POWDER

(71) Applicant: NGK INSULATORS, LTD., Nagoya-Shi (JP)

(72) Inventors: Takeshi Hagio, Inazawa (JP); Makoto Miyahara, Tajimi (JP); Hiroyuki Shibata, Okazaki (JP); Makiko Ichikawa, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 16/142,361

(22) Filed: Sep. 26, 2018

(65) Prior Publication Data
US 2019/0023580 A1 Jan. 24, 2019

Related U.S. Application Data

(63) Continuation of application No. PCT/JP2017/007415, filed on Feb. 27, 2017.

(30) Foreign Application Priority Data

Mar. 31, 2016 (JP) .................... 2016-072738

(51) Int. Cl.
*C01B 39/04* (2006.01)
*C01B 39/48* (2006.01)
(Continued)

(52) U.S. Cl.
CPC ............ *C01B 39/48* (2013.01); *B01J 29/06* (2013.01); *B01J 29/40* (2013.01); *B01J 29/70* (2013.01);
(Continued)

(58) Field of Classification Search
CPC ........ C01B 39/02; C01B 39/026; C01B 39/04; C01B 39/38; C01B 39/40; C01B 39/46;
(Continued)

(56) References Cited

U.S. PATENT DOCUMENTS 10,239,760 B2* 3/2019 Ueno ................. B01J 20/18
2011/0287261 A1 11/2011 Yajima et al.
(Continued)

FOREIGN PATENT DOCUMENTS

DE 4201455 A1 * 7/1993 ............ C01B 33/26
EP 2 394 958 A1 12/2011
(Continued)

OTHER PUBLICATIONS

Tom Wakihara, et al., "Fabrication of Fine Zeolite with Improved Catalytic Properties by Bead Milling and Alkali Treatment," *Applied Materials & Interfaces*, 2010, vol. 2, Issue 10, pp. 2715-2718.
(Continued)

*Primary Examiner* — David M Brunsman
(74) *Attorney, Agent, or Firm* — Burr & Brown, PLLC

(57) ABSTRACT

A production method for zeolite powder containing forming zeolite seed crystals by wet pulverizing zeolite crystals using a silica unsaturated alkali solution containing an alkali source, preparing a silica saturated alkali solution by adding a silica source to the silica unsaturated alkali solution containing the zeolite seed crystals, and synthesizing zeolite powder by hermetically heating the silica saturated alkali solution.

7 Claims, 2 Drawing Sheets

(51) Int. Cl.
    *B01J 29/40* (2006.01)
    *B01J 29/70* (2006.01)
    *B01J 29/06* (2006.01)
    *C01B 39/40* (2006.01)
    *C01B 39/38* (2006.01)
    *B01J 37/10* (2006.01)
    *B01J 37/00* (2006.01)
    *C01B 39/02* (2006.01)
    *C01B 39/46* (2006.01)

(52) U.S. Cl.
    CPC ........... *B01J 37/0072* (2013.01); *B01J 37/10* (2013.01); *C01B 39/02* (2013.01); *C01B 39/026* (2013.01); *C01B 39/04* (2013.01); *C01B 39/38* (2013.01); *C01B 39/40* (2013.01); *C01B 39/46* (2013.01); *B01J 2229/38* (2013.01); *C01P 2004/62* (2013.01)

(58) Field of Classification Search
    CPC ...... C01B 39/48; C01P 2004/62; B01L 29/06; B01L 29/40; B01L 29/70; B01L 37/0072; B01L 37/10; B01L 2229/38
    See application file for complete search history.

(56) References Cited

U.S. PATENT DOCUMENTS

2018/0072579 A1\* 3/2018 Petrovic .................. C01B 39/04
2019/0023579 A1\* 1/2019 Hagio ..................... C01B 39/02

FOREIGN PATENT DOCUMENTS

| JP | 2004-083375 A1 | 3/2004 |
| JP | 2013-049602 A1 | 3/2013 |
| WO | 2010/090049 A1 | 8/2010 |

OTHER PUBLICATIONS

Toni Wakihara, et al., "Top-Down Tuning of Nanosized Zeolites by Bead-Milling and Recrystallization," *Journal of the Japan Petroleum Institute*, Sep. 1, 2013, vol. 56, No. 4, pp. 206-213.
International Search Report and Written Opinion (Application No. PCT/JP2017/007415) dated May 23, 2017.
U.S. Appl. No. 16/140,989, filed Sep. 25, 2018, Hagio, et al.
English translation of International Preliminary Report on Patentability (Chapter 1) (Application No. PCT/JP2017/007415) dated Oct. 11, 2018.

\* cited by examiner

PRODUCTION METHOD FOR ZEOLITE POWDER

TECHNICAL FIELD

The present invention relates to a production method for zeolite powder.

BACKGROUND

In the related art, methods are known for synthesizing zeolite powder using a raw material solution that contains an alkali source and a silica source and in which zeolite seed crystals are dispersed (see, for example, WO/2010/090049 and Japanese Unexamined Patent Application Publication No. 2004-83375).

In Patent Document 1, a raw material solution is prepared by mixing a silica source in which zeolite seed crystals are dispersed into an alkali source. In Patent Document 2, a raw material solution is prepared by adding an alkali source to a mixture of water and a silica source and, thereafter, dispersing zeolite seed crystals.

SUMMARY

Reducing the particle size of zeolite powder leads to increases in the catalytic activity of the zeolite powder. As such, there is a demand for the synthesis of small particle size zeolite powder using fine zeolite seed crystals.

However, in the techniques discussed in Patent Documents 1 and 2, when fine zeolite seed crystals are used, the zeolite seed crystals aggregate in the raw material solution and, consequently, there is a limit as to how small the particle size of the zeolite powder can be made.

The present invention was made in view of the above background, and relates to a production method for small particle size zeolite powder.

A production method for zeolite powder according to the present invention includes forming zeolite seed crystals by wet pulverizing zeolite crystals using a silica unsaturated alkali solution containing an alkali source, preparing a silica saturated alkali solution by adding a silica source to the silica unsaturated alkali solution containing the zeolite seed crystals, and synthesizing zeolite powder by hermetically heating the silica saturated alkali solution.

According to the present invention, a production method for small particle size zeolite powder can be provided.

DETAILED DESCRIPTION OF THE PREFERRED EMBODIMENTS

Production Method for Zeolite Powder

Figure 1:
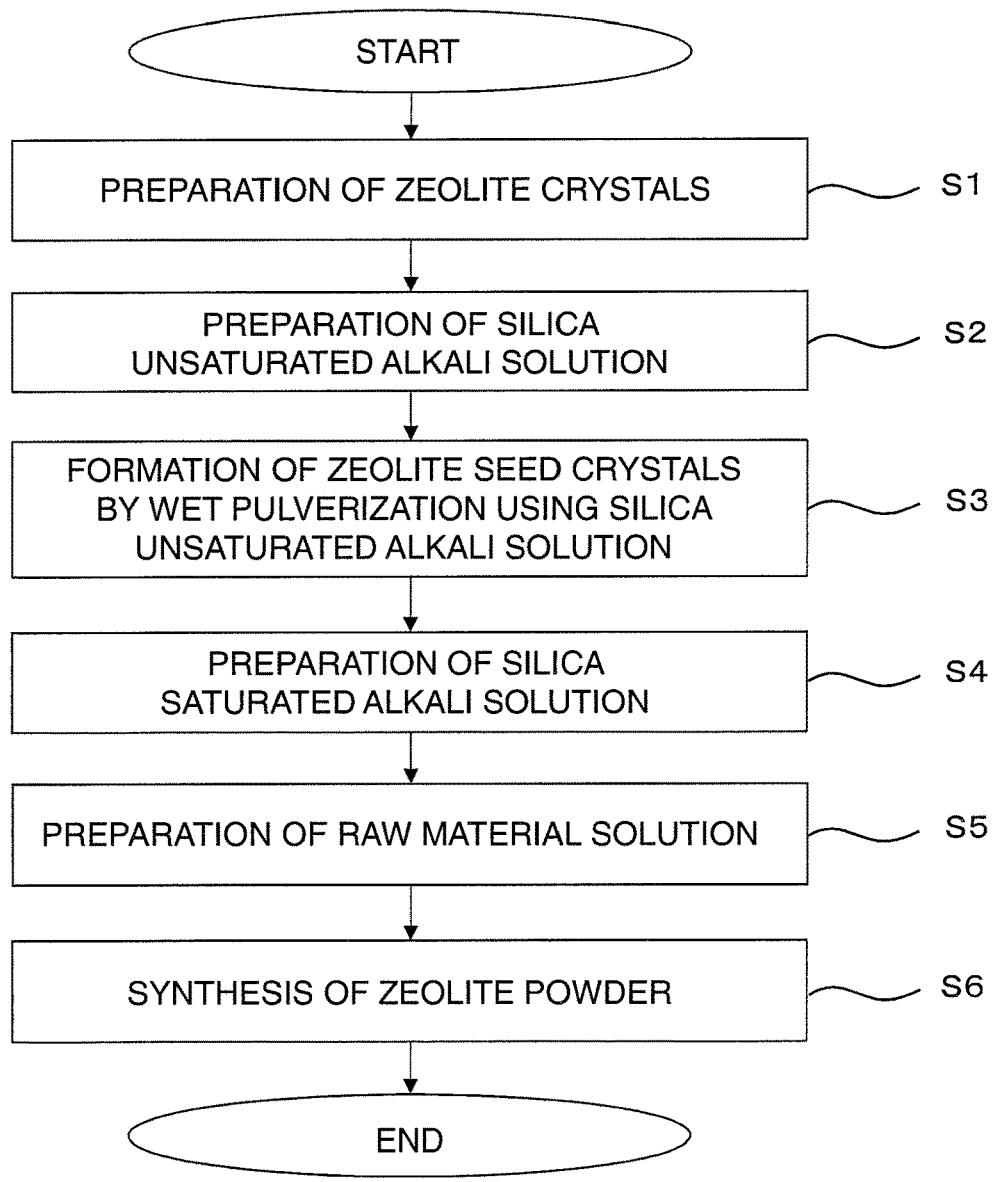
FIG. 1 is a flowchart illustrating a production method for zeolite powder.

Hereinafter a production method for zeolite powder according to embodiments of the present invention will be described with reference to the drawings. FIG. 1 is a flowchart illustrating a production method for zeolite powder.

1. Preparation of Zeolite Crystals (Step S1)

Figure 2:
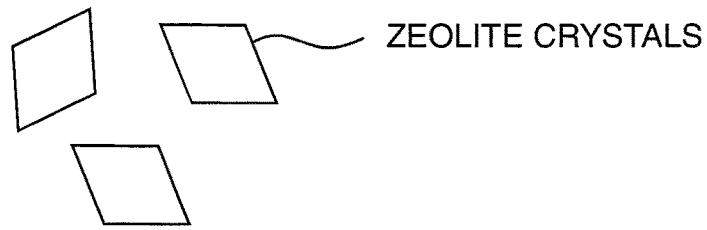
FIG. 2 is a schematic drawing illustrating zeolite crystals in a zeolite crystal dispersion solution.

First, zeolite crystals are prepared. The zeolite crystals can be synthesized via a known technique such as hydrothermal synthesis, or commercially available zeolite crystals can be used. The zeolite crystals may be in a dry state or in a state dispersed in a solvent. FIG. 2 is a schematic drawing illustrating the zeolite crystals in a zeolite crystal dispersion solution.

The type (framework) of the zeolite crystals is not particularly limited and can, for example, be selected from DDR, CHA, RHO, AFX, LTA, MFI, MOR, FER, FAU, and the like. While the type of the zeolite crystals is not particularly limited, it is preferable that the zeolite crystals are of the same crystal framework as the zeolite powder to be synthesized in order to realize efficient synthesis of the zeolite powder. Specifically, when synthesizing DDR framework zeolite powder, it is preferable that DDR framework zeolite crystals be used. Details of preparation methods for DDR framework zeolite crystals are described in M. J. den Exter, J. C. Jansen, H. Van Bekkum, Studies in Surface Science and Catalysis vol. 84, Ed. by J. Weitkamp et al., Elsevier (1994) 1159-1166.

An average particle size of the zeolite crystals is not particularly limited, but can be set to from 100 nm to 5,000 nm. From the perspective of fabricating zeolite seed crystals in a short period of time, the particle size of the zeolite crystals is preferably 500 nm or less and more preferably 300 nm or less. When the zeolite crystals are dispersed in a solvent (hereinafter referred to as "zeolite crystal dispersion solution"), the average particle size of the zeolite crystals is defined by the median diameter (d50) in a particle size distribution measurement obtained by the dynamic light scattering method. When the zeolite crystals are in a dry state, the average particle size of the zeolite crystals is defined by the average of area circle equivalent diameters (Heywood diameters) of ten primary particles randomly selected from an image observed using a transmission electron microscope (SEM).

The dispersion medium of the zeolite crystal dispersion solution is not particularly limited and water, an alcohol such as ethanol, a mixed solvent thereof, or the like can be used. From the perspectives of handling and cost, the dispersion medium is preferably water. The content of the zeolite crystals in the zeolite crystal dispersion solution is not particularly limited, but can, for example, be set to 1 wt % to 30 wt %.

2. Preparation of Silica Unsaturated Alkali Solution (Step S2)

Next a silica unsaturated alkali solution containing an alkali source is prepared.

Organic alkali, inorganic alkali, or a mixture thereof can be used as the alkali source. Ethylene diamine, hydrazine, ethanolamine, and the like can be used as the organic alkali. An alkali metal hydroxide such as sodium hydroxide (NaOH) and potassium hydroxide (KOH), an alkaline earth metal hydroxide such as $Ca(OH)_2$, or a mixture thereof can be used as the inorganic alkali.

The solvent may be omitted when using the organic alkali but, preferably, the organic alkali is mixed with water and used in order to reduce the degree of silica ($SiO_2$) saturation. When using the inorganic alkali, the solvent may be water, a lower alcohol, or a mixed solvent thereof.

Silica is in a non-saturated state in the silica unsaturated alkali solution. As described later, from the perspective of efficiently fabricating the zeolite seed crystals, the degree of silica saturation in the silica unsaturated alkali solution is preferably low. The degree of silica saturation in the silica unsaturated alkali solution preferably is 30% or less, more preferably is 20% or less, and particularly preferably is substantially 0%. Note that it is sufficient that the silica in the silica unsaturated alkali solution is in a non-saturated state, and a portion of the silica source (described later) may be added to the silica unsaturated alkali solution.

The pH of the silica unsaturated alkali solution is not particularly limited but, as described later, from the perspective of reducing re-aggregation of the zeolite seed crystals, preferably is 11 or higher and more preferably is 11.5 or higher.

3. Formation of Zeolite Seed Crystals by Wet Pulverization Using Silica Unsaturated Alkali Solution (step S3)

Figure 3:
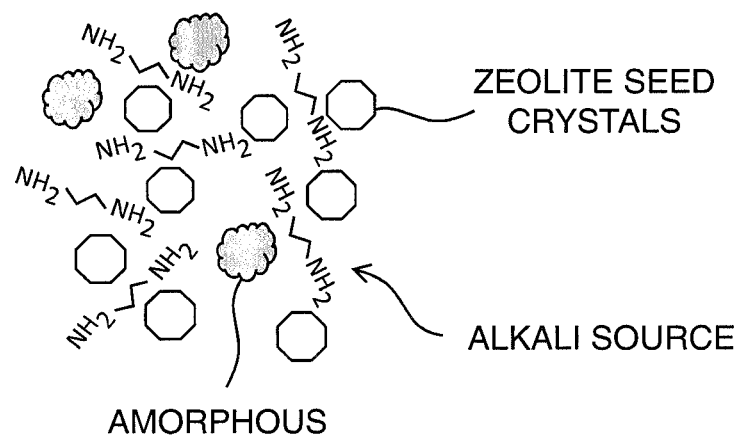
FIG. 3 is a schematic drawing illustrating wet pulverized zeolite seed crystals in a silica unsaturated alkali solution.

Next, the zeolite crystals are added to the silica unsaturated alkali solution and wet pulverized. Thus, zeolite seed crystals are formed. Here, a case is described in which a zeolite crystal dispersion solution is used. FIG. 3 is a schematic drawing illustrating the wet pulverized zeolite seed crystals in the silica unsaturated alkali solution. In FIG. 3, an example is illustrated in which ethylene diamine is used as the alkali source of the silica unsaturated alkali solution.

The wet pulverization can be carried out using a bead mill or the like. The pulverization time is not particularly limited, but can, for example, be set to from 30 minutes to 180 minutes. The zeolite seed crystals are formed by wet pulverizing the zeolite crystals contained in the zeolite crystal dispersion solution. At this time, the amorphous component produced due to the pulverization of the zeolite crystals is dissolved by the silica unsaturated alkali solution. Thus, the zeolite seed crystals become unlikely to be incorporated into the amorphous component and aggregating. Additionally, the separated state of the zeolite seed crystals is maintained due to the alkali source (the ethylene diamine in FIG. 3) being present between the formed zeolite seed crystals and also due to the generation of intrinsic zeta potential, corresponding to the pH value of the silica unsaturated alkali solution, in the zeolite seed crystals.

The particle size of the zeolite seed crystals is not particularly limited, but can, for example, be set to from 10 nm to 250 nm. From the perspective of synthesizing small particle size zeolite powder, the particle size of the zeolite seed crystals is preferably 170 nm or less and more preferably 100 nm or less. The average particle size of the zeolite seed crystals is defined by the median diameter (d50) in a particle size distribution measurement obtained by the dynamic light scattering method.

The content of the zeolite seed crystals in the silica unsaturated alkali solution is not particularly limited, but can, for example, be set to 0.1 wt % to 15 wt %.

4. Preparation of Silica Saturated Alkali Solution (Step S4)

Next, a silica saturated alkali solution is prepared by adding a silica source and the silica unsaturated alkali solution containing the disintegrated zeolite seed crystals to pure water.

For example, amorphous silica, colloidal silica, silica gel, sodium silicate, silicate gel of amorphous aluminum, tetraethoxysilane (TEOS), trimethylethoxysilane, mixtures thereof, or the like can be used as the silica source.

The silica is in a saturated state in the silica saturated alkali solution. The silica preferably is in a supersaturated state in the silica saturated alkali solution. That is, the degree of silica saturation in the silica saturated alkali solution preferably is greater than 100%.

The amount of the zeolite seed crystals in the silica saturated alkali solution is not particularly limited, but the content of the zeolite seed crystals in the silica saturated alkali solution can be set to 1 wt % to 10 wt %.

5. Preparation of Raw Material Solution (Step S5)

Next, a raw material solution is prepared by adding, as necessary, an aluminum source, an alkali source, and the like to the silica saturated alkali solution.

Aluminum hydroxide, aluminum nitrate, sodium aluminate, and the like can be used as the aluminum source. Organic alkali, inorganic alkali, or a mixture thereof can be used as the alkali source. The alkali source used in the preparation of the raw material solution may be the same as the alkali source used in the preparation of the silica unsaturated alkali solution, or may be different from the alkali source used in the preparation of the silica unsaturated alkali solution.

A structure directing agent (organic template) may be added to the raw material solution. As a result of adding a structure directing agent to the raw material solution, it is possible to increase the ratio of silicon atoms in the synthesized zeolite powder, thereby improving the acid resistance of the zeolite powder.

The structure directing agent is not particularly limited, and amines, quaternary ammonium salts, and the like can be used. Examples of the amines include cations derived from alicyclic amines such as 1-adamantanamine, 3-quinacridinal, and 3-exo-aminonorbornene. Of these, when synthesizing a DDR framework zeolite, the structure directing agent is preferably a cation derived from 1-adamantanamine.

In cases in which the structure directing agent is added to the raw material solution, it is preferable that the structure directing agent is added to a solvent, the resulting mixture is subjected to ultrasonic treatment and, thereafter, the structure directing agent is added to the raw material solution together with the alkali source.

6. Synthesis of Zeolite Powder (Step S6)

Figure 4:
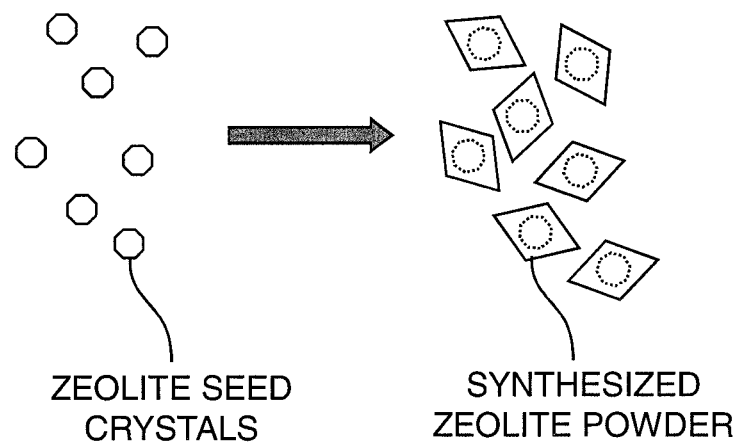
FIG. 4 is a schematic drawing illustrating zeolite powder being synthesized.

Next, zeolite powder is hydrothermally synthesized by hermetically heating the raw material solution. FIG. 4 is a schematic drawing illustrating the zeolite powder being synthesized.

The heating temperature of the hydrothermal synthesis is not particularly limited, but can be set to from 80° C. to 200° C. From the perspective of efficiently crystallizing the zeolite, the heating temperature of the hydrothermal synthesis preferably is 100° C. or higher and more preferably is 120° C. or higher. Additionally, to reduce the synthesis of zeolite powders of different crystal types than the zeolite seed crystals, the heating temperature of the hydrothermal synthesis preferably is 190° C. or lower and more preferably is 180° C. or lower.

The heating time of the hydrothermal synthesis is not particularly limited, but can be set to from 1 hour to 10 days. From the perspective of sufficiently crystallizing the zeolite, the heating time of the hydrothermal synthesis preferably is 5 hours or longer and more preferably is 10 hours or longer. Additionally, to reduce the synthesis of zeolite powders of different crystal types than the zeolite seed crystals, the heating time of the hydrothermal synthesis preferably is 5 days or shorter and more preferably is 3 days or shorter.

The synthesized zeolite powder is washed with water and then heat treated to incinerate the structure directing agent. The heat treatment temperature is not particularly limited, but can be set to from 350° C. to 900° C. The heat treatment time can be set to from 0.5 hours to 200 hours.

Other Embodiments

In the embodiment described above, the zeolite crystal dispersion solution is added to the silica unsaturated alkali solution. However, a configuration is possible in which dried zeolite seed crystals or zeolite seed crystals recovered from the zeolite crystal dispersion solution and then dried are added to the alkali source. In this case, the zeolite crystals are more likely to aggregate due to the drying, but the zeolite seed crystals can be formed as described above by wet pulverizing the zeolite crystals in the silica unsaturated alkali solution. Note that the zeolite crystals can be recovered from the zeolite crystal dispersion solution by filtration or decantation, or can be recovered by drying (at 80° C., for example) the zeolite crystal dispersion solution as-is.

In the embodiment described above, the structure directing agent is added to the silica saturated alkali solution, but the structure directing agent may be added to the silica unsaturated alkali solution.

In the embodiment described above, the alkali source is added again to the silica saturated alkali solution in the raw material solution preparation step (step S5), but the entire content of the alkali source may be added to the silica unsaturated alkali solution used in the wet pulverization. In this case, the silica saturated alkali solution can be used as the raw material solution without modification.

EXAMPLES

Next, examples of the present invention will be described. Note that the present invention shall not be construed to be limited in any way to the examples described hereinafter.

Example 1

1. Fabrication of Zeolite Seed Crystals

A DDR framework zeolite crystal dispersion solution having a pH of 11.7 and containing DDR framework zeolite crystals having an average particle size of 179 nm was prepared in accordance with the method described in patent document WO/2010/090049.

Next, pure water was added so that the prepared DDR framework zeolite crystal dispersion solution contained 7 wt % of the DDR framework zeolite crystals. Then, 30 g of ethylene diamine (hereinafter referred to as "EDA") was added to 500 g of the prepared DDR framework zeolite crystal dispersion solution. Thus, a silica unsaturated alkali solution having a pH of 11.9 and containing DDR framework zeolite crystals was prepared. The degree of silica saturation in the silica unsaturated alkali solution was 2% or less. This silica unsaturated alkali solution containing the DDR framework zeolite crystals was wet pulverized using a bead mill for 60 minutes. Then, DDR framework zeolite seed crystals were recovered while adding pure water. Thus, a DDR framework zeolite seed crystal dispersion solution (silica unsaturated alkali solution) containing 2.9 wt % solid content was prepared.

2. Synthesis of DDR Framework Zeolite Powder 1.0 g of 1-adamantanamine (hereinafter referred to as "1-ADA") was added to and completely dissolved in 6.3 g of EDA. Additionally, 52.1 g of the DDR framework zeolite seed crystal dispersion solution and 26.2 g of colloidal silica were added to 169.1 g of pure water and lightly stirred. Next, the EDA in which the 1-ADA had been dissolved was added and the resulting mixture was stirred for 60 minutes. Thus, a raw material solution (silica saturated alkali solution) was prepared.

Next, the raw material solution was transferred to a 100 ml Teflon (registered trademark) container and hydrothermally synthesized (for 20 hours at 120° C.) using a hot air dryer. Thus, a DDR framework zeolite powder was synthesized.

Next, the average particle size of the DDR framework zeolite powder according to Example 1 was measured using a particle size distribution measuring device (MICROTRAC UPA-EX150, manufactured by MicrotracBEL). The average particle size in this case was 128 nm. Additionally, the crystal phase of the DDR framework zeolite powder according to Example 1 was confirmed to be DDR framework using an X-ray diffractometer (MiniFlex, manufactured by Rigaku Corporation).

Example 2

1. Fabrication of Zeolite Seed Crystals

A DDR framework zeolite crystal dispersion solution having a pH of 12.1 and containing DDR framework zeolite crystals having an average particle size of 183 nm was prepared via the same method used in Example 1.

Next, pure water was added so that the prepared DDR framework zeolite crystal dispersion solution contained 7 wt % of the DDR framework zeolite crystals. Then, 30 g of EDA was added to 500 g of the prepared DDR framework zeolite crystal dispersion solution. Thus, a silica unsaturated alkali solution having a pH of 12.2 and containing DDR framework zeolite crystals was prepared. The degree of silica saturation in the silica unsaturated alkali solution was 1% or less. This silica unsaturated alkali solution containing the DDR framework zeolite crystals was wet pulverized using a bead mill for 90 minutes. Then, DDR framework zeolite seed crystals were recovered while adding pure water. Thus, a DDR framework zeolite seed crystal dispersion solution (silica unsaturated alkali solution) containing 3.9 wt % solid content was prepared.

2. Synthesis of DDR Framework Zeolite Powder 0.5 g of 1-ADA was added to and completely dissolved in 3.3 g of EDA. Additionally, 19.4 g of the DDR framework zeolite seed crystal dispersion solution and 13.1 g of colloidal silica were added to 91.2 g of pure water and lightly stirred. Next, the EDA in which the 1-ADA had been dissolved was added and the resulting mixture was stirred for 60 minutes. Thus, a raw material solution (silica saturated alkali solution) was prepared. A DDR framework zeolite powder was synthesized via the same method used in Example 1.

Next, the average particle size of the DDR framework zeolite powder according to Example 2 was measured via the same method used in Example 1. The average particle size in this case was 116 nm. Additionally, the crystal phase of the DDR framework zeolite powder according to Example 2 was confirmed to be DDR framework via the same method used in Example 1.

Example 3

1. Fabrication of Zeolite Seed Crystals

A DDR framework zeolite crystal dispersion solution having a pH of 11.4 and containing DDR framework zeolite crystals having an average particle size of 173 nm was prepared via the same method used in Example 1.

Next, pure water was added so that the prepared DDR framework zeolite crystal dispersion solution contained 7 wt % of the DDR framework zeolite crystals. Then, 20 g of a 1M NaOH aqueous solution was added to 500 g of the prepared DDR framework zeolite crystal dispersion solution. Thus, a silica unsaturated alkali solution having a pH of 13.4 and containing DDR framework zeolite crystals was prepared. The degree of silica saturation in the silica unsaturated alkali solution was 0.1% or less. This silica unsaturated alkali solution containing the DDR framework zeolite crystals was wet pulverized using a bead mill for 90 minutes. Then, DDR framework zeolite seed crystals were recovered while adding pure water. Thus, a DDR framework zeolite seed crystal dispersion solution (silica unsaturated alkali solution) containing 3.8 wt % solid content was prepared.

2. Synthesis of DDR Framework Zeolite Powder 0.5 g of 1-ADA was added to and completely dissolved in 3.3 g of EDA. Additionally, 20.6 g of the DDR framework zeolite seed crystal dispersion solution and 13.1 g of colloidal silica were added to 90.0 g of pure water and lightly stirred. Next, the EDA in which the 1-ADA had been dissolved was added and the resulting mixture was stirred for 60 minutes. Thus, a raw material solution (silica saturated alkali solution) was prepared. In Example 3, the DDR framework zeolite powder was synthesized via the same method as in Example 1, with the exception of the hydrothermal synthesis being carried out for 16 hours at 160° C.

Next, the average particle size of the DDR framework zeolite powder according to Example 3 was measured via the same method used in Example 1. The average particle size in this case was 109 nm. Additionally, the crystal phase of the DDR framework zeolite powder according to Example 3 was confirmed to be DDR framework via the same method used in Example 1.

Example 4

1. Fabrication of Zeolite Seed Crystals

A DDR framework zeolite crystal dispersion solution having a pH of 11.4 and containing DDR framework zeolite crystals having an average particle size of 173 nm was prepared via the same method used in Example 1.

Next, pure water was added so that the prepared DDR framework zeolite crystal dispersion solution contained 7 wt % of the DDR framework zeolite crystals. Then, 20 g of a 5M NaOH aqueous solution was added to 500 g of the prepared DDR framework zeolite crystal dispersion solution. Thus, a silica unsaturated alkali solution having a pH of 13.9 and containing DDR framework zeolite crystals was prepared. The degree of silica saturation in the silica unsaturated alkali solution was 0.1% or less. This silica unsaturated alkali solution containing the DDR framework zeolite crystals was wet pulverized using a bead mill for 90 minutes. Then, DDR framework zeolite seed crystals were recovered while adding pure water. Thus, a DDR framework zeolite seed crystal dispersion solution (silica unsaturated alkali solution) containing 3.6 wt % solid content was prepared.

2. Synthesis of DDR Framework Zeolite Powder 0.5 g of 1-ADA was added to and dissolved in 3.3 g of 1M NaOH. Additionally, 20.6 g of the DDR framework zeolite seed crystal dispersion solution and 13.1 g of colloidal silica were added to 90.0 g of pure water and lightly stirred. Next, the 1M NaOH in which the 1-ADA had been dissolved was added and the resulting mixture was stirred for 60 minutes. Thus, a raw material solution (silica saturated alkali solution) was prepared. A DDR framework zeolite powder was synthesized via the same method used in Example 1.

Next, the average particle size of the DDR framework zeolite powder according to Example 4 was measured via the same method used in Example 1. The average particle size in this case was 101 nm. Additionally, the crystal phase of the DDR framework zeolite powder according to Example 4 was confirmed to be DDR framework via the same method used in Example 1.

Example 5

1. Fabrication of Zeolite Seed Crystals

A 40 wt % tetrapropylammonium hydroxide aqueous solution (hereinafter referred to as "TPAOH") and tetrapropylammonium bromide (hereinafter referred to as "TPABr") were added to pure water and stirred until the mixture became clear. Then, colloidal silica ($SiO_2$ 30 wt % solution) as the silica source was added and the resulting mixture was stirred. Thus, a raw material solution having a composition ratio of 1 $SiO_2$:0.36 TPAOH:0.36 TPABr:15 H2O was prepared. This raw material solution was transferred to a Teflon (registered trademark) container and hydrothermally synthesized (for 12 hours at 110° C.) using a hot air dryer. Thus, an MFI framework zeolite crystal dispersion solution having a pH of 12.3 and containing MFI framework zeolite crystals having an average particle size of 204 nm was prepared.

Next, pure water was added so that the prepared MFI framework zeolite crystal dispersion solution contained 7 wt % of the MFI framework zeolite crystals. Then, 50 g of a 1M NaOH aqueous solution was added to 500 g of the prepared MFI framework zeolite crystal dispersion solution. Thus, a silica unsaturated alkali solution having a pH of 13.6 and containing MFI framework zeolite crystals was prepared. The degree of silica saturation in the silica unsaturated alkali solution was 0.1% or less. This silica unsaturated alkali solution containing the MFI framework zeolite crystals was wet pulverized using a bead mill for 45 minutes. Then, MFI framework zeolite seed crystals were recovered while adding pure water. Thus, an MFI framework zeolite seed crystal dispersion solution (silica unsaturated alkali solution) containing 3.3 wt % solid content was prepared.

2. Synthesis of MFI Framework Zeolite Powder 2.01 g of TPABr, 0.22 g of aluminum sulfate, and 6.00 g of colloidal silica ($SiO_2$ 30 wt % solution) were added to 56.77 g of a 5M NaOH aqueous solution and stirred and, then, 15.00 g of the MFI framework zeolite seed crystal dispersion solution was added. Thus, a raw material solution (silica saturated alkali solution) was prepared.

Next, the silica saturated alkali solution was transferred to a 100 ml Teflon (registered trademark) container and hydrothermally synthesized (for 20 hours at 160° C.) using a hot air dryer. Thus, an MFI framework zeolite powder was synthesized.

Next, the average particle size of the MFI framework zeolite powder according to Example 5 was measured via the same method used in Example 1. The average particle size in this case was 154 nm. Additionally, the crystal phase of the zeolite powder according to Example 5 was confirmed to be MFI framework via the same method used in Example 1.

Comparative Example 1

In Comparative Example 1, a DDR framework zeolite powder was synthesized via the same method as in Example 1, with the exception that the DDR framework zeolite seed crystal dispersion solution had a pH of 10.4 and was prepared by wet pulverization without adding the EDA.

The average particle size of the DDR framework zeolite powder according to Comparative Example 1 was measured via the same method used in Example 1. The average particle size in this case was 148 nm. Additionally, the crystal phase of the DDR framework zeolite powder according to Comparative Example 1 was confirmed to be DDR framework via the same method used in Example 1.

Comparative Example 2

In Comparative Example 2, a DDR framework zeolite powder was synthesized via the same method as in Example 2, with the exception that the DDR framework zeolite seed crystal dispersion solution had a pH of 10.2 and was prepared by wet pulverization without adding the EDA.

The average particle size of the DDR framework zeolite powder according to Comparative Example 2 was measured via the same method used in Example 1. The average particle size in this case was 137 nm. Additionally, the crystal phase of the DDR framework zeolite powder according to Comparative Example 2 was confirmed to be DDR framework via the same method used in Example 1.

Comparative Example 3

In Comparative Example 3, a DDR framework zeolite powder was synthesized via the same method as in Example 4, with the exception that the DDR framework zeolite seed crystal dispersion solution had a pH of 10.1 and was prepared by wet pulverization without adding the 5M NaOH.

The average particle size of the DDR framework zeolite powder according to Comparative Example 3 was measured via the same method used in Example 1. The average particle size in this case was 121 nm. Additionally, the crystal phase of the DDR framework zeolite powder according to Comparative Example 3 was confirmed to be DDR framework via the same method used in Example 1.

Comparative Example 4

In Comparative Example 4, an MFI framework zeolite powder was synthesized via the same method as in Example 5, with the exception that the MFI framework zeolite seed crystal dispersion solution had a pH of 10.6 and was prepared by wet pulverization without adding the 1M NaOH.

The average particle size of the MFI framework zeolite powder according to Comparative Example 4 was measured via the same method used in Example 1. The average particle size in this case was 178 nm. Additionally, the crystal phase of the zeolite powder according to Comparative Example 4 was confirmed to be MFI framework via the same method used in Example 1.

As shown in Table 1, in Example 1 in which, with the exception that the zeolite crystals were wet pulverized using the silica unsaturated alkali solution, the hydrothermal synthesis was performed under the same conditions as Comparative Example 1, it was possible to reduce the average particle size of the zeolite powder. This was due to the amorphous component, which was produced through the pulverization of the zeolite crystals, being dissolved in the silica unsaturated alkali solution, thereby reducing the zeolite seed crystals to be incorporated into the amorphous component and aggregated; and due to the zeta potential being generated in the zeolite seed crystals by the alkali, thereby enabling the maintenance of the separated state of the zeolite seed crystals.

Moreover, it was confirmed from comparisons of Example 2 and 3 with Comparative Example 2, Example 4 with Comparative Example 3, and Example 5 with Comparative Example 4 that the average particle size of the zeolite powder can be reduced by the zeolite crystals being wet pulverized using the silica unsaturated alkali solution.

Additionally, it was confirmed from comparisons of Examples 1 and 2 with Examples 3 and 4 that the average particle size of the zeolite powder can be reduced regardless of the alkali source used in the wet pulverization. Furthermore, it was found that the average particle size of the zeolite powder is more likely to be smaller when NaOH is used instead of EDA or when the pH is high.

Moreover, it was confirmed from a comparison of Example 1 with Example 2 that the average particle size of the zeolite powder can be made even smaller by setting the wet pulverization time to be 90 minutes or longer.

Additionally, it was confirmed from a comparison of Example 3 with Examples 4 that the average particle size of the zeolite powder can be made smaller by increasing the concentration of the alkali source used in the wet pulverization.

Moreover, since advantageous results were obtained in Example 5 in which the MFI framework zeolite powder was synthesized, it was confirmed that the production method of the present invention is effective for powders other than DDR framework zeolite powders.

INDUSTRIAL APPLICABILITY

A production method for small particle size zeolite powder can be provided with the production method for zeolite powder according to the present invention. As such, the present invention is useful in the zeolite field.

TABLE 1

| Sample No. | Wet pulverization time (min) | Alkali source used in wet pulverization | Crystal framework | Ave. particle size of zeolite powder (nm) | Sample No. | Wet pulverization time (min) | Crystal framework | Ave. particle size of zeolite powder (nm) |
| --- | --- | --- | --- | --- | --- | --- | --- | --- |
| Example 1 | 60 | EDA | DDR | 128 | Comparative Example 1 | 60 | DDR | 148 |
| Example 2 | 90 | EDA | DDR | 116 | Comparative Example 2 | 90 | DDR | 137 |
| Example 3 | 90 | NaOH | DDR | 109 | | | | |
| Example 4 | 90 | NaOH | DDR | 101 | Comparative Example 3 | 90 | DDR | 121 |
| Example 5 | 45 | NaOH | MFI | 154 | Comparative Example 4 | 45 | MFI | 178 |

What is claimed is:

1. A production method for zeolite powder comprising:
forming zeolite seed crystals by wet pulverizing zeolite crystals using a silica unsaturated alkali solution containing an alkali source;
preparing a silica saturated alkali solution by adding a silica source to the silica unsaturated alkali solution containing the zeolite seed crystals; and
synthesizing a zeolite powder by hermetically heating the silica saturated alkali solution.

2. The production method for zeolite powder according to claim 1, wherein
a degree of silica saturation in the silica unsaturated alkali solution is 30% or less.

3. The production method for zeolite powder according to claim 2, wherein
the degree of silica saturation in the silica unsaturated alkali solution is substantially 0%.

4. The production method for zeolite powder according to claim 1, wherein
a pH of the silica unsaturated alkali solution is 11.5 or higher.

5. The production method for zeolite powder according to claim 1, wherein
the silica unsaturated alkali solution contains at least one of ethylene diamine and sodium hydroxide as the alkali source.

6. The production method for zeolite powder according to claim 1 further comprising:
adding a structure directing agent to the silica unsaturated alkali solution or the silica saturated alkali solution before the synthesizing of the zeolite powder.

7. The production method for zeolite powder according to claim 1, wherein
the zeolite crystals are DDR framework zeolite crystals or MFI framework zeolite crystals, and
the zeolite powder is a DDR framework zeolite powder or an MFI framework zeolite powder.

* * * * *